United States Patent
Machin

(10) Patent No.: US 6,939,035 B2
(45) Date of Patent: Sep. 6, 2005

(54) SYSTEM FOR CALIBRATING THERMOMETERS

(75) Inventor: Graham Machin, Teddington (GB)

(73) Assignee: The Secretary of State of Her Majesty's Britannic Government, London (GB)

( * ) Notice: Subject to any disclaimer, the term of this patent is extended or adjusted under 35 U.S.C. 154(b) by 105 days.

(21) Appl. No.: 10/171,474

(22) Filed: Jun. 11, 2002

(65) Prior Publication Data

US 2003/0026318 A1 Feb. 6, 2003

(30) Foreign Application Priority Data

Jun. 13, 2001 (GB) .............................................. 0114429

(51) Int. Cl.[7] .............................................. G01K 15/00
(52) U.S. Cl. .............................. 374/2; 374/3; 374/208; 250/252.1
(58) Field of Search .............................. 374/208, 1, 2, 374/3; 250/252.1

(56) References Cited

U.S. PATENT DOCUMENTS

| | | | |
|---|---|---|---|
| 3,077,539 A | * | 2/1963 | Blau, Jr. et al. ................. 374/2 |
| 3,348,408 A | * | 10/1967 | Engborg ......................... 374/2 |
| 4,011,552 A | * | 3/1977 | Quirke ........................... 374/1 |
| 4,199,021 A | * | 4/1980 | Thoma .......................... 252/70 |
| 4,244,207 A | * | 1/1981 | Staunton ........................ 374/3 |
| 4,523,859 A | | 6/1985 | Bonnier et al. ................. 374/1 |
| 4,627,740 A | * | 12/1986 | Jerde et al. ..................... 374/1 |
| 5,183,337 A | * | 2/1993 | Pompei .......................... 374/2 |
| 5,219,225 A | | 6/1993 | Ball ................................ 374/1 |
| 5,608,838 A | * | 3/1997 | Brookley ........................ 374/2 |
| 6,193,411 B1 | * | 2/2001 | Chen ............................. 374/2 |
| 6,293,695 B1 | | 9/2001 | Schmermund ................. 374/1 |
| 6,398,405 B1 | * | 6/2002 | Yamada ......................... 374/1 |
| 6,447,160 B1 | * | 9/2002 | Fraden .......................... 374/2 |
| 6,641,299 B2 | * | 11/2003 | Sasajima et al. ................ 374/2 |
| 6,663,277 B1 | * | 12/2003 | Sandmael ...................... 374/3 |
| 6,709,152 B1 | * | 3/2004 | Bronlund ....................... 374/3 |

FOREIGN PATENT DOCUMENTS

| | | |
|---|---|---|
| EP | 1008839 A2 | 6/2000 |
| GB | 2223100 | 3/1990 |
| JP | 54157669 | 12/1979 |
| JP | 1234774 | 9/1989 |
| SU | 1700395 | 12/1991 |

\* cited by examiner

*Primary Examiner*—Gail Verbitsky
*Assistant Examiner*—Stanley J. Pruchnic, Jr.
(74) *Attorney, Agent, or Firm*—Sheridan Ross PC

(57) ABSTRACT

A device (10) for calibrating tympanic thermometers includes an enclosure (12) which may be heated or cooled depending upon the testing temperature. Within the enclosure (12) there is provided a sealed flask (14) which contains substance (16) which melts at the test temperature (this may be ethylene carbonate, melting point 36.3° C.). Located within the sealed flask (14) is a re-entrant well (18) which provides the blackbody for testing tympanic thermometers and a viewing aperture (20). The well (18) is treated to achieve a high surface emissivity. The device (10) allows the testing of thermometers by measuring the triple point or melting point of the substance (16). As the temperature of the substance (16) is accurately known, so is the temperature in the blackbody cavity (18) and thermometers can be calibrated thereby.

10 Claims, 1 Drawing Sheet

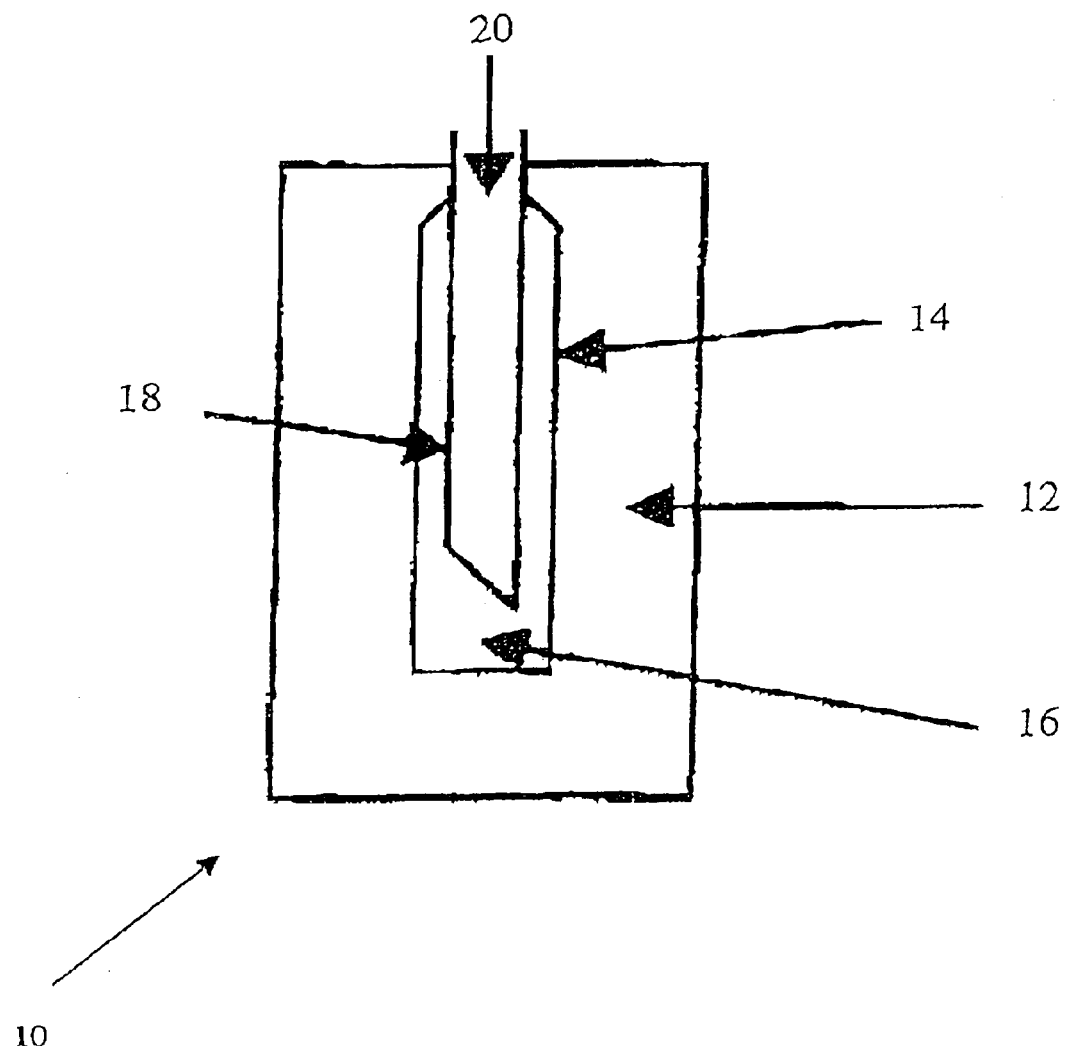

US 6,939,035 B2

SYSTEM FOR CALIBRATING THERMOMETERS

FIELD OF THE INVENTION

The present invention relates to a system for calibrating thermometers, in the preferred embodiment providing a fixed point blackbody calibrator for tympanic thermometers (ear thermometers).

BACKGROUND OF THE INVENTION

Tympanic thermometers are in widespread use by hospitals, doctors and a wide variety of health-care professionals. The thermometers are usually batch-tested at the time of manufacture, before being sold. Little or no subsequent testing of the performance of the thermometers is generally performed after purchase. However the rise in litigation due to mis-treatment and mis-diagnosis and the take up of quality systems (as an aid to safe practice) in hospitals are becoming powerful drivers to get medical diagnostic instruments, including tympanic thermometers, tested.

Manufacturers of the devices and a few national measurement institutes have variable temperature blackbody sources that are used for testing tympanic thermometers. These rely on contact thermometers to determine the temperature of the blackbody cavity. They can, however, suffer from the following problems:

i) the blackbody cavity is some distance from the Contact thermometers, leading to difficult to quantify and often unsuspected temperature errors;

ii) the contact thermometers require periodic calibrating to ensure correct operation. This means either that the calibration source is not in operation while the thermometers are being calibrated or that the laboratory has to purchase extra thermometers to keep the calibrator available;

iii) the blackbody source is immersed in liquid (to minimise temperature gradients) but this reduces the calibration/test equipment portability and there is always the potential of spillage. If such spillage was into the blackbody source its reliability would be adversely affected;

iv) skilled operation is required, often needing the tympanic thermometers to be sent to a specialist laboratory for testing and calibration, resulting to either non-availability of the device during its calibration period or the purchase of an additional device to cover calibration periods.

SUMMARY OF THE PRESENT INVENTION

The present invention seeks to provide easy and reliable testing and/or calibration of thermometers.

According to the present invention, there is provided a system for testing the accuracy of a thermometer including a housing containing a substance having a known triple point or melting temperature and an access point allowing measurement of the temperature of the substance.

The substance, or compound has a fixed known melting point or triple point and thus provides a known temperature to which a thermometer can be tested.

In the preferred embodiment, the access point includes a blackbody cavity. This allows for the testing of tympanic thermometers.

Advantageously, the housing is sealed. This provides insulation to pressure changes and can therefore make the device substantially pressure independent.

Preferably, the system includes heating and/or cooling means operable to heat and/or cool the substance to above and/or below its triple point or melting point The substance may be ethylene carbonate.

The preferred embodiment provides a fixed-point blackbody which uses the melting/freezing point of a pure substance to realise a unique temperature. In one example, there is provided a fixed-point blackbody cavity that has pure ethylene carbonate (melting point 36.3° C.) as its working material. Such a fixed point in the normal operating range of the tympanic thermometer can be a boon providing a simple assured way of providing reliable device operation.

DESCRIPTION OF THE DRAWING

An embodiment of the present invention is described below, by way of example only, with reference to the accompanying drawing, in which the sole FIGURE is a schematic representation of an embodiment of blackbody thermometer calibrator.

DESCRIPTION OF THE PREFERRED EMBODIMENT

Referring to the FIGURE, the device 10 includes an enclosure 12 which may be heated or cooled depending upon the testing temperature, and thus the substance, used. Heating or cooling may be provided in the enclosure 12 by any suitable means such as water or electrical. One embodiment uses Peltier elements within the enclosure 12 which can be driven either to heat or to cool depending upon the current supplied thereto. An alternative embodiment uses a resistive heating element. The skilled person will readily be able to devise suitable heating or cooling systems.

Within the enclosure 12 there is provided a sealed flask 14 which contains the substance 16 which melts at the test temperature. In the example shown, the substance 16 is intended for use in testing tympanic thermometers and is preferably ethylene carbonate, which has a melting point of 36.3° C.

As can be seen in the Figure, located within the sealed flask 14 is a re-entrant well 18 which provides the blackbody for testing tympanic thermometers. In the preferred embodiment, the well 18 is substantially circular in axial cross-section. The well 18 is integral with the flask 14 to seal the flask 14.

The well 18 provides a viewing aperture 20 for a tympanic thermometer, mimicking the ear canal.

The well 18 is treated to achieve a high surface emissivity. Typically, this is achieved by coating the interior surface with a high emissivity (black) paint. It also has a length to aperture ratio of between 3:1 to 10:1, preferably of 5:1. The length of the well 18 is preferably such that the blackbody cavity it forms has an emissivity high enough to yield negligible radiance temperature error. In the preferred embodiment, the maximum error allowed is around 10 mK to 20 mK.

Moreover, the end wall of the well 18 is at an angle of around 45° to the side walls to enhance emissivity. The actual angle is not critical although any angle less than 90° will improve emissivity.

The flask and well may be made of glass, a plastics material or of any other suitable material.

The device 10 allows the testing of the thermometers by measuring the triple point or melting point of the substance 16, in this example ethylene carbonate. To achieve this, the device would be put in a heated enclosure and warmed up until the melting point. One or more tympanic thermometers is then placed to view the black body of the well 18 and a temperature reading is taken, the blackbody mimicking the radiance from the tympanic membrane. As the temperature of the substance 16 is accurately known, so is the temperature in the blackbody cavity 18 and thermometers can be calibrated thereby.

When all testing has been performed the device can be switched off for cooling down and re-freezing of the ethylene carbonate.

As mentioned above, a different thermometric material other than ethylene carbonate could be used to test tympanic thermometers, as long as it has a melting point within the operating range of the thermometer. An array of several fixed points at a few degree intervals could be made for checking tympanic thermometers over their range of operation.

In other implementations, portable instant non-contact thermometer checkers could be provided for veterinary practices and also for lower temperature food applications where non-contact thermometers are used routinely at 3 to 5° C., by using a suitable thermometric fixed-point substance which will be apparent to the skilled person.

The advantages of the described embodiments include the following;

i) no contact thermometer is required to determine the temperature of the blackbody cavity;

ii) the temperature of the blackbody cavity is determined solely by the phase transition of the material and is therefore repeatable to −10 mK over periods of years with no need to recalibrate;

iii) no thermometric liquids need be involved so there would be no possibility of spillage or of contaminating the blackbody cavity with liquid;

iv) the device can be small, rot much larger than a cup, hence transportable;

v) the device can be used successfully with minimum knowledge or training.

It is to be understood that many modifications and alterations to the described embodiments will be apparent to the skilled person leaving regard to the teachings provided herein and that these modifications and alterations are intended to fall within the scope of the appended claim.

I claim:

1. A system for testing the accuracy of a thermometer, the system including:

a sealed housing containing a substance having a known triple point or melting temperature;

a sealed enclosure fixedly enclosing the sealed housing and being provided with at least one of a heating and a cooling means for bringing said substance to its known triple point or melting temperature, a well formed in the sealed housing wherein said well is integral with, and seals said sealed housing and said well is not enclosed by said sealed enclosure, the temperature of the well being determined substantially solely by the triple point or melting point of said substance.

2. A system for testing the accuracy of a thermometer comprising:

a sealed housing containing a substance having a known triple point or melting temperature;

a sealed enclosure fixedly enclosing the sealed housing and being provided with at least one of a heating and a cooling means, for bringing said substance to its known triple point or melting temperature;

a well formed in the sealed housing and having well walls wherein said well is integral with and seals said sealed housing and is not enclosed by said sealed enclosure; and said well forming an access point defined by said well walls and not enclosed by said enclosure and allowing measurement of the temperature of the substance, the temperature of the access point being determined substantially solely by the triple point or melting point of the substance.

3. A system according to claim 2, wherein the access point includes a blackbody cavity.

4. A system according to claim 3, wherein the substance is ethylene carbonate.

5. A system according to claim 2, wherein the substance is ethylene carbonate.

6. A system according to claim 2, including a plurality of said housings each containing a substance having a known triple point or melting temperature and a plurality of said access points, wherein each access point is arranged in a respective one of said housings whereby measurement of the temperature of the substance in said respective one of said housing is enabled.

7. A system according to claim 2, wherein the system is portable.

8. A system according to claim 2, wherein said at least one of heating and cooling means includes Peltier elements within the enclosure.

9. Apparatus according to claim 2, wherein said heating means includes a resistive heating element in the enclosure.

10. Apparatus according to claim 2, wherein water is provided in said enclosure.

* * * * *